W. S. OBERFELDER.
PUNCTURE PROOF TUBE AND PROCESS OF PRODUCING SAME.
APPLICATION FILED SEPT. 5, 1916.
1,244,236.
Patented Oct. 23, 1917.
2 SHEETS—SHEET 1.
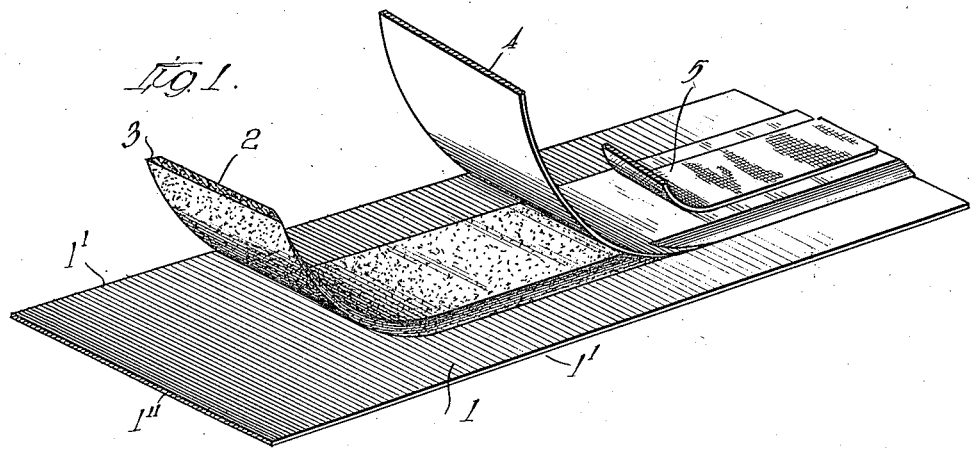
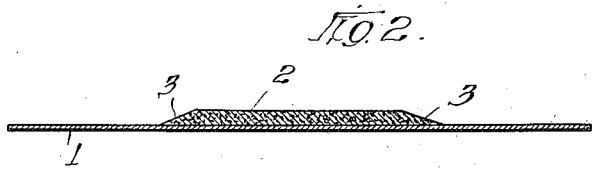
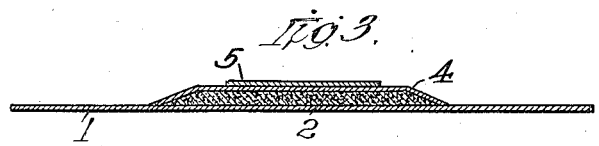
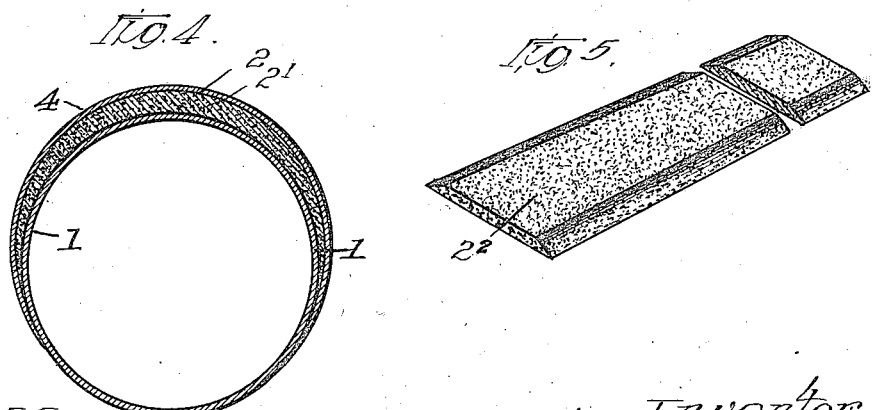
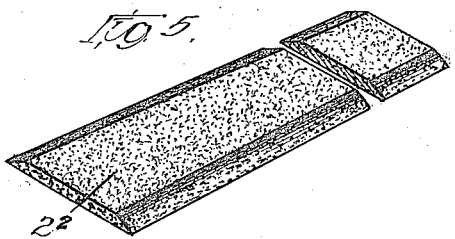

W. S. OBERFELDER.
PUNCTURE PROOF TUBE AND PROCESS OF PRODUCING SAME.
APPLICATION FILED SEPT. 5, 1916.

1,244,236.

Patented Oct. 23, 1917.

UNITED STATES PATENT OFFICE.

WALTER S. OBERFELDER, OF CHICAGO, ILLINOIS.

PUNCTURE-PROOF TUBE AND PROCESS OF PRODUCING SAME.

1,244,236.   Specification of Letters Patent.   Patented Oct. 23, 1917.

Application filed September 5, 1916. Serial No. 118,340.

*To all whom it may concern:*

Be it known that I, WALTER S. OBERFELDER, a citizen of the United States, residing at Chicago, in the county of Cook and State of Illinois, have invented certain new and useful Improvements in Puncture-Proof Tubes and Processes of Producing Same, of which the following is the specification.

This invention relates to tube construction, and particularly to a method of making tires or inner tubes adapted to automatically close punctures in said tires or inner tubes.

It is an object of the invention to equip tires or inner tubes with a heavy layer of cheap rubber, or like material, so constructed as to automatically become compressed upon its inner surface when the tube is in condition for use and thus become self-healing or self-closing.

It is another object of the invention to cheapen the manufacture of self-healing tires by devising a method for using a lower grade rubber therein.

It is another object of the invention to devise a method whereby the self-healing layer of my improved tube will be subjected to a double compressing action.

Other objects and advantages of the invention will appear as the description to follow proceeds.

In the drawings,

Figure 1 is a perspective view showing the various layers of my tube.

Fig. 2 is a cross sectional view in one of its stages;

Fig. 3 is a cross sectional view of the tire blank in completed form;

Fig. 4 is a cross sectional view of a modified form of the inflated and completed inner tube within the outer casing;

Fig. 5 is a perspective view of a blank applicable for the purposes of my invention;

Figure 6:
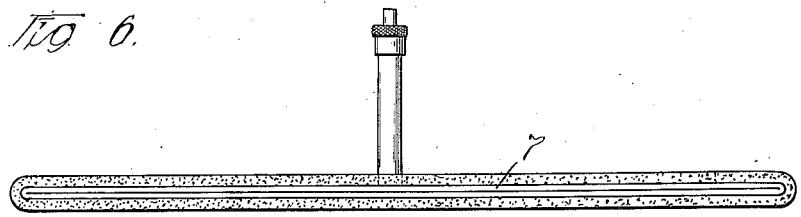
Fig. 6 is an elevation of an inner tube constructed in accordance with my invention.

I am fully aware that it has been heretofore proposed to provide a layer of soft rubber which is made under compression so as to have a self-sealing action. In all of such tubes which are at all practicable, however, mechanical compression means, such as layers of fabric, incorporated into the tube, are employed to obtain the compression. This is objectionable, because the fabric employed is frequently broken off, is very expensive to incorporate in the body of the rubber, and when so incorporated introduces a tendency to leak because the finest cotton fiber, owing to its cellular nature, provides a pathway or channel along which air will flow under the high pressure employed in tubes.

Other tubes of this same general class and in the prior art are made by first making a tube having a soft rubber layer therein and then turning said tube inside out, the thick layer of rubber being made of two or more layers of different classes of rubber which are very expensive due to the quality of rubber used.

My invention has none of these defects and disadvantages, because the compression by it is obtained solely by the shape given to the inner tube by its inflation within an outer casing, and furthermore, because by reason of the manner of manufacture a double compression is obtained when the tube is placed inside an outer tube and inflated.

In the manufacture of my tube, I take a strip of rubber 1, long and wide enough to form an inner tube. Upon this strip of rubber I vulcanize a heavy, thick strip of compressible material 2, as for instance, soft rubber, such as blown or sponged rubber or the like (which, as is well known, may be made of very inferior rubber at very low cost). The compressible material is firmly vulcanized to the layer of rubber 1, and has its edges finely beveled, as indicated at 3. Over the layer 2, I preferably vulcanize a rubber layer 4, wide enough to cover the layer 2 and to be directly secured to the layer 1. Over the rubber layer 4, I next secure a narrow strip of canvas, or other fabric, 5. This layer is not provided to assist in any way in obtaining compression but only to prevent punctures from spreading in the outer layer. The fabric 5 may be cemented upon the tire and may sometimes be applied after the preceding layers have been made into a complete tube.

The built-up structure shown in Fig. 1 is next formed into a tube upon a mandrel, which is perfectly flat, the longitudinal edges 1' being united and the ends 1" are thereafter united to form a complete tube. It is to be particularly noted that, as the tube is made flat, the bending involved in first forming a tube and in thereafter uniting the ends of that tube will serve to give a double compression upon the inner side of the layer 2, when the tube is inflated inside an outer casing, thus serving adequately to close all punctures. It is further to be noted that this result comes from the shape of the tube itself when inflated after being placed inside an outer tube, and not because of the presence of the fabric layer or because it was turned inside out. The building up of this tube from flat strips entirely is responsible for this result.

In Fig. 4 I show a cross section of a completed inner tube in acting position without the fabric layer 5, wherein it will be seen that the inner region 2' of the soft or sponged rubber layer, or equivalent substance, 2, is tightly compressed. The outer strip 4 and inner strip 1 in this modification are the same as those shown in Fig. 1, the fabric strip 5 merely being omitted.

In Fig. 2 I show a modification of the invention, in which the inner tube is composed entirely of the layer 1 and the layer 2 directly vulcanized thereto, the layer 4 of Fig. 1 being dispensed with. In this modification, the fabric strip 5 may be applied either after or before the tube has been formed, or left out.

In Fig. 5, I disclose a strip $2^2$ of compressible material such as sponge rubber or the like which can be vulcanized to a completed tube, the result appearing in Fig. 6, in which it will be particularly noted that the flat strip $2^2$, when secured upon the collapsed flat inner tube 7, assumes the form shown when this inner tube is placed inside a tire involving the curvatures above alluded to, and the corresponding compressions will necessarily take place.

Figure 7:
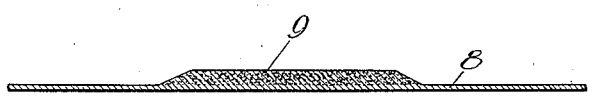
Fig. 7 is a cross sectional view of a modification of the invention.

In Fig. 7, I show another way of constructing the tube of my invention, which consists in forming the layer 8, of rubber and the cheaper layer of sponge rubber or the like 9 in one piece by using an appropriately formed blank of rubber, thickened in the middle, and sponging the upper part of the thickened portion. This piece of rubber, as it stands, may be formed into an inner tube with the resulting compressions as above described and will be ready for use without further treatment. A fabric layer 5 should preferably be applied to prevent punctures from spreading. This layer may be cemented on.

Figure 8:
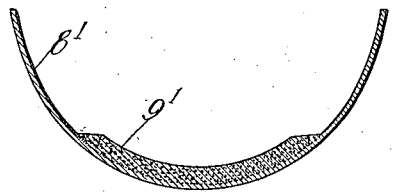
Fig. 8 is a cross sectional view of another modification of the invention.

In Fig. 8 is a modification in which the sponge rubber layer 9', which, in this instance is shown as formed integrally with the high-grade rubber layer 8', is originally formed in curved or gutter shape. In forming the tube, it is bent oppositely from the curvature shown in Fig. 8, thereby increasing the compression along the inner side thereof when the tube is placed within an outer casing and inflated. This is the preferable form for large tires. Of course, it will be understood that the thickness of the soft rubber compressible layer may be varied in accordance with the size of the tire and the demands to be made upon it. The term "sponge rubber" as employed in the specification is generic. The preferable form is fibered sponge rubber which cannot stretch but is compressible. While the application of sponge rubber for the purpose herein described is a feature of the invention, the invention broadly of course does not concern sponge rubber or even rubber, but rather the construction of a tire so as to automatically become puncture proof when inflated in a case for use, owing to its shape and that of the parts of which it is constructed and their relative arrangement. Any material other than rubber having the properties of rubber for the purposes of this invention might obviously be substituted for rubber without departing from the scope of the invention.

The different forms of tubes described may be made of different kinds of rubber and then vulcanized or otherwise fastened together or the entire tube may be made in one operation.

I claim:—

1. A tube comprising a layer of rubber or the like, a heavy layer of soft, compressible material secured thereto, a layer of rubber or the like overlying said soft material and a narrow strip of fabric secured over said second layer of rubber or the like.

2. A tube comprising a tube of high-grade rubber having a thick strip of sponge rubber vulcanized thereupon in the tread region of the tube.

3. A tube made up of a flat strip of rubber, having a flat strip of thick, soft, compressible rubber attached thereto while the strips are laid flat, said combined strips being afterward united at their longitudinal edges to form a tube and at their ends to form an annular tube or tire.

4. A tube made up of a flat strip of high-grade rubber, to which is vulcanized a heavy flat strip of sponge rubber prior to forming the tube on a mandrel or the like, whereby the sponge rubber will be so located with respect to the tire as to be given a compression in two directions when the tire is made up and inflated.

5. An inner tube made of a flat strip of resilient material and a thick flat strip of resilient material attached thereto.

6. A tread portion for tires of sponge or soft rubber having beveled longitudinal edges adapted to be attached to the tread portion of inner tubes.

7. An inner tube comprising layers, one of said layers being composed of a flat thick, rubber, said inner tube when uninflated being flat and comprising parts normally flat, but when inflated inside an outer tube acquiring an annular and tubular form whereby double compression on the thick layer of rubber is obtained.

8. As an article of manufacture, a tube made up of a normally flat blank rubber or the like, including a strip of soft compressible material, said blank being united at its edges and its ends to form an annular closed tube suitable for use as an inner tube or the like, the bending operations involved in forming the annular closed tube causing said strips of soft compressible material to be compressed in two directions when the tube is inflated.

9. The method of making an inner tube which consists in forming a flat blank having a strip of compressiible material therein and a layer of elastic material substantially impermeable to air, thereafter uniting said blank at its longitudinal edges and at its ends to form a flat doubled closed annular tube which when inflated in a suitable casing will form an annular tube of circular cross section, whereby the compressible material therein will be compressed and serve to automatically seal up punctures.

In witness whereof, I hereunto subscribe my name to this specification in the presence of two witnesses.

WALTER S. OBERFELDER.

Witnesses:
I. V. CURRAN,
SEBASTIAN HINTON.